United States Patent
Rajagopalan et al.

(10) Patent No.: US 6,354,123 B1
(45) Date of Patent: Mar. 12, 2002

(54) PIPELINE MANDREL POSITIONING CONTROL SYSTEM

(75) Inventors: Shankar T. Rajagopalan, Cypress; Sridhar Madala, Houston, both of TX (US)

(73) Assignee: CRC-Evans Pipeline International, Inc., Houston, TX (US)

( * ) Notice: Subject to any disclaimer, the term of this patent is extended or adjusted under 35 U.S.C. 154(b) by 0 days.

(21) Appl. No.: 09/481,900

(22) Filed: Jan. 12, 2000

Related U.S. Application Data (63) Continuation of application No. 09/301,429, filed on Apr. 28, 1999, now Pat. No. 6,092,406.

(51) Int. Cl.[7] .............................................. B21C 51/00
(52) U.S. Cl. ..................... 72/31.01; 72/17.2; 72/20.1; 72/31.04; 340/854.6
(58) Field of Search .................. 72/17.2, 20.1, 72/21.1, 31.01, 31.04, 31.05, 31.06, 369, 370.01; 405/154.1, 159, 160, 184.4; 340/825.69, 825.72, 853.3, 853.8, 854.1, 854.6, 855.5

(56) References Cited

U.S. PATENT DOCUMENTS

| | | | |
|---|---|---|---|
| 3,705,506 A | * 12/1972 | Clavin et al. | 72/21 |
| 3,949,292 A | * 4/1976 | Beaver et al. | 324/37 |
| 5,033,391 A | 7/1991 | Watanabe | 104/23.2 |
| 5,038,107 A | * 8/1991 | Gianzero et al. | 324/339 |
| 5,182,516 A | 1/1993 | Ward et al. | 324/326 |
| 5,469,155 A | 11/1995 | Archambeault et al. | 340/853.4 |
| 5,585,790 A | * 12/1996 | Luling | 340/853.8 |
| 5,651,638 A | 7/1997 | Heggerud | 405/154 |
| 6,061,000 A | * 5/2000 | Edwards | 340/854.6 |
| 6,253,595 B1 | * 7/2001 | Lewis, Jr. | 72/31.05 |

FOREIGN PATENT DOCUMENTS

GB          2 038 585 A          7/1980

* cited by examiner

*Primary Examiner*—Ed Tolan
(74) *Attorney, Agent, or Firm*—Sidley Austin Brown & Wood

(57) ABSTRACT

A method and apparatus is provided for automated control and positioning of a mandrel within a pipe during bending operations. Position detection is accomplished by means of a low frequency electromagnetic signal transmission from a coil placed in close proximity parallel to the pipe outer surface. This signal is detected by a pair of orthogonal receiving coils mounted on the mandrel in close proximity to the pipe inner surface. The phases of the received signals with respect to the transmitted signal and the ratio of the amplitudes of the two received signals is used to estimate the relative position of the transmitter and the receivers. Control of the mandrel along with transmission of reference phase information is accomplished via a high frequency direct sequence spread spectrum radio link between a computer console outside the pipe mounted on the bender and a computer unit mounted inside the pipe on the mandrel.

26 Claims, 8 Drawing Sheets

PIPELINE MANDREL POSITIONING CONTROL SYSTEM

This application is a continuation of U.S. patent application Ser. No. 09/301,429, filed Apr. 28, 1999, now U.S. Pat. No. 6,092,406 the contents of which are hereby incorporated by reference.

TECHNICAL FIELD OF THE INVENTION

The current invention relates to mandrels used for bending large diameter pipes. In one aspect, it relates to a control system for automatically positioning the mandrel within the pipe during bending operations.

BACKGROUND OF THE INVENTION

It is well known to utilize a mandrel positioned within a pipe to provide internal support to the pipe walls and thereby prevent buckling of the walls during bending of the pipe. Mandrels used for bending large diameter steel pipes of the type used for oil and gas pipelines (i.e., where the pipe diameter can exceed 48 inches and the pipe wall thickness can exceed one inch) are very large pieces of equipment which can weigh many tons. Such mandrels typically have powered wheels or treads which can be remotely controlled to facilitate the longitudinal movement of the mandrel within the pipe.

When bending large diameter pipe to create a curved section, it is common practice to perform a succession of small discrete bends at longitudinally spaced positions along the pipe. After each bend, the pipe is moved longitudinally through the bending apparatus until the location for the next desired bend is at the bending station. The mandrel must also be repositioned inside the pipe after each bend to provide support at the next bend position. During the course of such bending operations, the mandrel can be located fifty feet or more from the pipe end, and it is often out of sight of the person controlling it. Nevertheless, to achieve optimum results the mandrel must be accurately positioned with respect to the bending station, preferably within one inch of the desired location, when each bend is performed.

Typically, large mandrels are positioned within the pipe under the control of a dedicated mandrel operator who remains at the end of the pipe and sends movement commands to the mandrel by means of an electrical cable or similar direct control device. However, the mandrel operator typically has no way to directly determine the position of the mandrel with respect to the bending station. Instead, indirect measurements means must be used, such as determining the position of the pipe end relative to the bending station and then determining the position of the mandrel relative to the pipe end. The latter determination is often accomplished using a reach rod, i.e., a rigid pole of known length connected to the end of the mandrel and extending from the end of the pipe. After determining the estimated position of the mandrel with respect to the bending station, the operator sends movement commands to the mandrel until it has been moved into the desired position.

The use of a dedicated mandrel operator for positioning a mandrel within the pipe has numerous disadvantages. First, employing a dedicated mandrel operator represents a considerable expense to the pipeline contractor. Second, the positioning accuracy of the mandrel is dependent upon the skill and care of the mandrel operator and is subject to significant deviations caused by human error. Third, the speed of the bending operation is highly dependent on the skill and experience of the mandrel operator. For example, the weight of the mandrel results in considerable inertia which must be accounted for during movement, otherwise, the mandrel will "overshoot" the desired position. This can result in a time consuming series of back-and-forth movements each time the mandrel is repositioned. Finally, manual control systems require the human operator to stand along the line of motion of the heavy moving mandrel and pipe. A need therefore exists, for a system which can control the position of a mandrel within a pipeline without requiring a dedicated mandrel operator.

In view of the disadvantages inherent with manual control of the mandrel, systems for automatically positioning a mandrel within a pipe have been proposed. For example, U.S. Pat. No. 5,651,638 to Heggerud discloses an apparatus for controlling the position and operation of equipment within a pipeline. The Heggerud patent discloses and electromagnetic communication system including transmitting and receiving antenna external to the pipe for transmitting and receiving signals through the wall of the pipe to and from, respectively, receiving and transmitting antenna mounted on equipment within the pipe. The Heggerud patent discloses one approach to controlling the position of a mandrel within a pipeline, however, a need exists for alternative systems for automatically controlling the position of a mandrel within a pipeline.

SUMMARY OF THE INVENTION

The present invention is a method and apparatus for both manual and automated control and positioning of a mandrel within a pipe during bending operations. Position detection is accomplished by means of a low frequency electromagnetic signal transmission from a coil placed in close proximity parallel to the pipe outer surface. This signal is detected by a pair of orthogonal receiving coils mounted on the mandrel in close proximity to the pipe inner surface. The phases of the received signals with respect to the transmitted signal and the ratio of the amplitudes of the two received signals are used to estimate the relative position of the transmitter and the receivers.

Control of the mandrel along with transmission of reference phase information is accomplished via a high frequency direct sequence spread spectrum radio link between a computer console outside the pipe mounted on the bender and a computer unit mounted inside the pipe on the mandrel.

BRIEF DESCRIPTION OF THE DRAWINGS

A more complete understanding of the invention and its advantages will be apparent from the following detailed description when taken in conjunction with the accompanying drawings in which.

DETAILED DESCRIPTION

Figure 1:
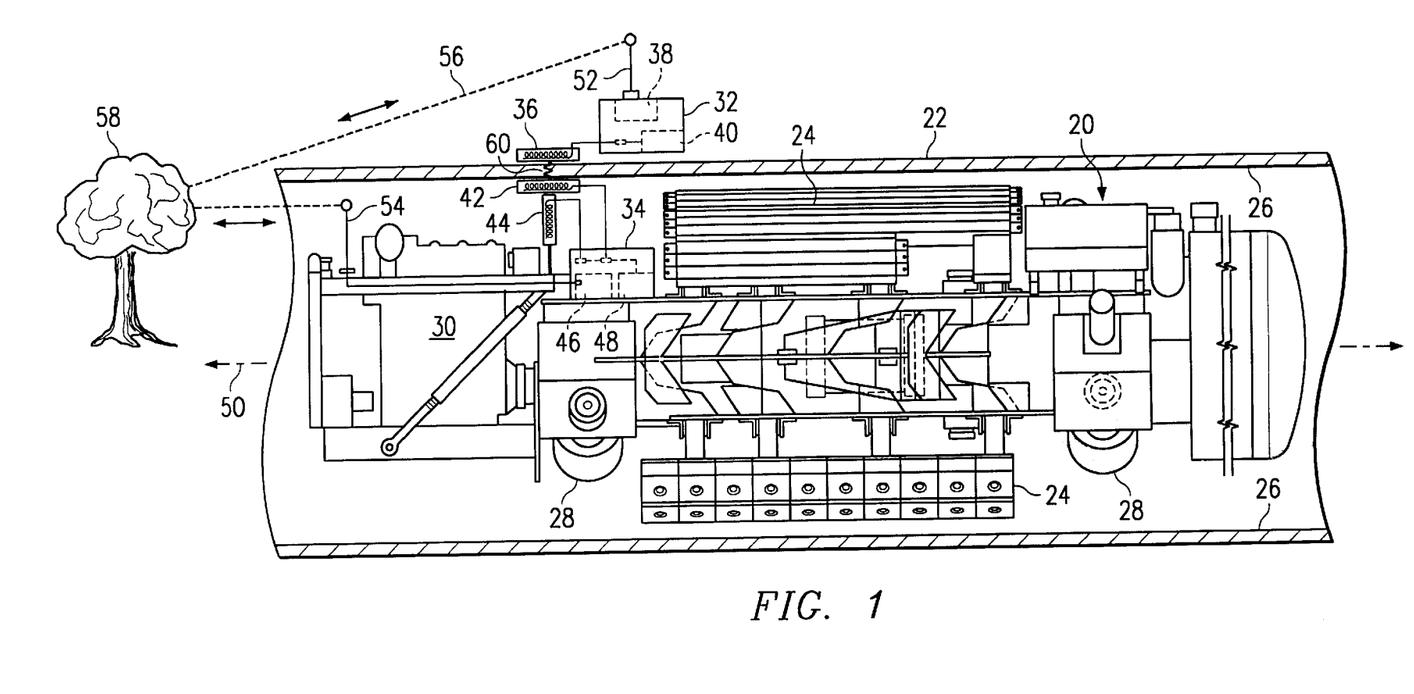
FIG. 1 is a partial cross-sectional view showing a pipeline mandrel position control system according to one aspect of the current invention, including a mandrel control unit mounted on a mandrel within a pipe and a bender control unit positioned external to the pipe.

Referring now to the drawings, wherein like reference numbers are used to designate like elements throughout the various views, several aspects of the current invention are further described. Referring first to FIG. 1, shown therein is a mandrel 20 of a type well known in the art which is suitable for use in one aspect of the current invention. The mandrel 20 is positioned within a pipe 22 and includes upper and lower spring units 24, also known as shoes, which can be extended into engagement with the interior surface of pipe walls 26 to support the walls during the bending operation. After bending, the shoes 24 can be retracted to allow the mandrel 20 to move longitudinally through the pipe 22 using wheels 28. Power for movement of the shoes 24 and operation of the wheels 28 is supplied by engine unit 30.

To provided automatic control of the position of the mandrel 20 within the pipe 22, this aspect of the current invention includes a bender control unit ("BCU") 32 mounted external to the pipe on the bending apparatus (not shown) and a mandrel control unit ("MCU") 34 mounted on the mandrel 20. The BCU 32 comprises a transmit coil 36, a direct sequence spread spectrum ("DSS-type") radio frequency modem 38, and a computer control unit 40. The MCU 34 comprises two receive coils 42 and 44, a DSS-type radio frequency modem 46, and a computer control unit 48. Coils having a length of about 9 inches and a diameter of about 4 inches have proven suitable for use as transmit and receive coils 36, 42 and 44, however other size coils known in the art for low frequency electromagnetic communication can be used.

Figure 2:
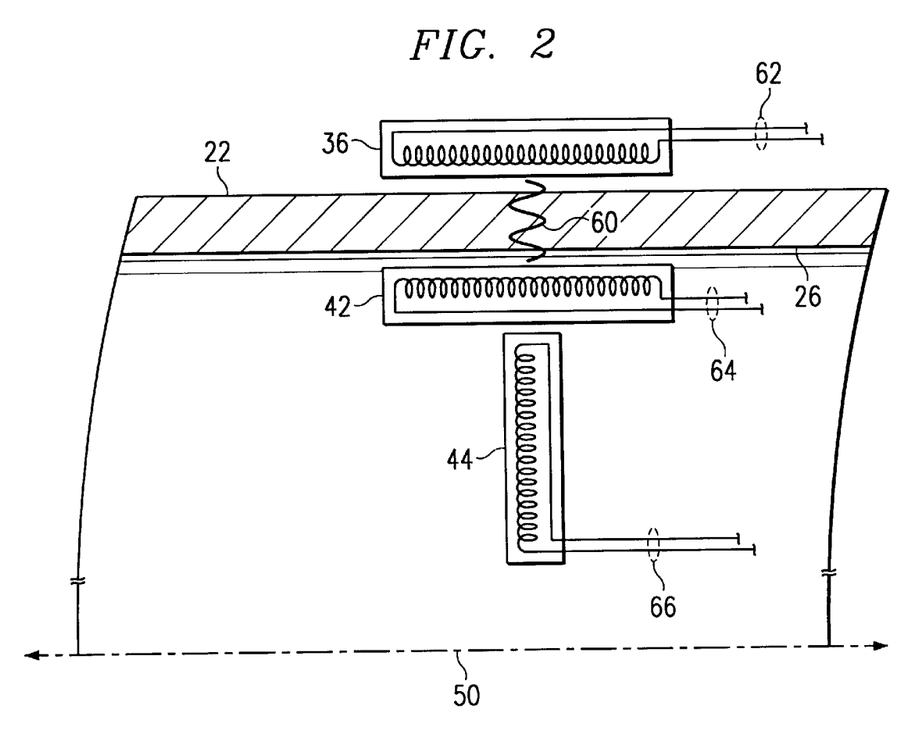
FIG. 2 is a partial cross-sectional view showing the relative orientation of the transmit coil and the receive coil on opposite sides of the pipe wall.

Referring now also to FIG. 2, the relative orientation of the transmit coil 36 and the receive coils 42 and 44 will be further described. The transmit coil 36 is mounted on the bender unit (not shown) outside of the pipe wall 26 in close proximity to the external surface of the pipe 22. The longitudinal axis of the transmit coil 36 is oriented parallel to the longitudinal axis 50 of the pipe 22. The receive coils 42 and 44 are mounted on the mandrel inside the pipe 22. One of the receive coils, parallel receive coil 42, is mounted with its longitudinal axis oriented parallel to the longitudinal axis 50 of the pipe 22. The other receive coil, perpendicular receive coil 44, is mounted with its longitudinal axis oriented perpendicular to the longitudinal axis 50 of the pipe 22. The receive coils 42, 44 are mounted such that when the mandrel shoes 24 are in the expanded position the coils are in close proximity to the inner surface of pipe wall 26.

As further described below, the BCU 32 and MCU 34 of the current invention utilize one-way transmission of low frequency electromagnetic signals transmitted through the pipe wall barrier in combination with two-way transmission of high frequency digital data transmitted around the pipe wall barrier to provide very accurate detection of a mandrel's position within the pipe and to further to provide for automated or remote manual control of a mandrel within a pipe.

Two-way digital communication between the BCU 32 and the MCU 34 is provided by the DSS-type radio frequency modems 38, 46 which transmit through antenna 52 and 54, respectively. The transmissions between antenna 52 and 54 (denoted generally in FIG. 1 by dashed line 56) do not pass through the pipe wall barrier but instead are reflected around the pipe wall 26 by objects (denoted generally in FIG. 1 by tree 58) in the surrounding environment, for example terrain, building, vehicles, vegetation, etc. A frequency of about 2.4 GHz is known to be effective for DSS communication between the BCU 32 and the MCU 34. The DSS-type communication technique, which is well known in the art, has the advantage of improved reliability under multi-path interference conditions and the high frequency of operation permits operation with small pipe diameters. A radio link range of about 0.66 miles has been demonstrated with the equipment of the embodiment shown. Since the typical anticipated operation range for the equipment is a few hundred feet, reliability is greatly enhanced.

A constant flow of two-way messages (50 or more per second) is transmitted in the form of command packets from the BCU 32 to the MCU 34 and corresponding response packets sent from the MCU back to the BCU upon receipt of each command packet. The BCU command packets include mandrel control information and timing update information (described below), while the MCU response packets include mandrel position information and input status information. Loss of a valid communication stream (i.e., command packets not received by the MCU 34 for a predetermined time or expected response packets not received from the MCU by the BCU 32 within a predetermined time after sending) will result in the MCU 34 executing safety measures such as shutdown of hydraulic controls and eventual shutdown of the mandrel engine unit 30.

The BCU 32 records the send time for each command packet sent to the MCU 34 and the receipt time for the corresponding response packet received from the MCU. The BCU 32 then calculates the round-trip ("RT") transmission time for each packet and maintains a running average round-trip ("ART") time calculated from a predetermined number of the most recent RT times. The ART time is utilized in detecting the mandrel position as further explained below. An ART time based on the 100 most recent RT times has been shown to provide satisfactory results.

As mentioned above, the one-way transmission of low frequency electromagnetic signals (denoted generally in FIGS. 1 and 2 by wave 60) transmitted through the pipe wall barrier is used in combination with the two-way communication described above to determine the position of the mandrel 20 within the pipe 22. The BCU 32 generates a continuous low frequency sinusoidal electromagnetic signal 60 by exciting (via leads 62) the transmit coil 36 mounted outside the pipe 22 in close proximity to the outer surface of the pipe. The frequency of this signal is preferably within the range from about 21 Hz to about 24 Hz, and more preferably is within the range from about 22 Hz to about 23 Hz. Signal frequencies lower than about 21 Hz tend to encounter interference from engine noise originating with the mandrel or other nearby equipment and known to be strong at 18 Hz. Signal frequencies higher than 24 Hz rapidly lose the ability to penetrate the metal pipe wall barrier with sufficient strength to provide useful range. This signal 60 is detected by a pair of receive coils 42, 44 mounted on the mandrel 20 inside the pipe 22 in close proximity to the inner surface of the pipe wall 26. The amplitude and relative phase of these signals is used to estimate the relative position between the transmitting coil 36 and the receiving coils 42, 44.

FIGS. 3a–3d shows plots of the amplitudes and phases of the signals on leads 64 and 66 received by the parallel receive coil 42 and the perpendicular receive coil 44, respectively, versus the relative position of the receive coils with respect to the transmit coil 36. The signal transmitted by the transmit coil 36 is supplied by leads 62. For convenience, the signal transmitted by the transmit coil 36, and received by the parallel receive coil 42 and perpendicular receive coil 44, will hereafter be referred to using the reference numbers of the corresponding leads, namely 62, 64 and 66, respectively.

Figure 3A:
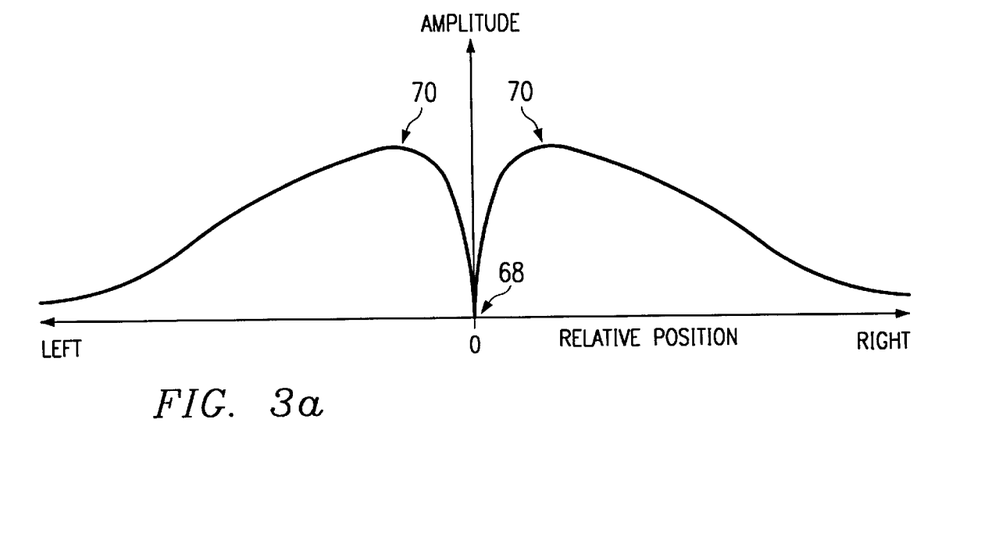
FIG. 3a is a graph of the amplitude of the signal produced by the perpendicular receive coil as a function of the relative longitudinal position of the perpendicular receive coil from the longitudinal center of the transmit coil.

FIG. 3a is a graph of the amplitude of the signal 66 received by perpendicular receive coil 44 versus the relative longitudinal position of the perpendicular receive coil with respect to the center of the transmit coil 36. As shown in FIG. 3a, the amplitude of the perpendicular receive signal 66 has a null 68 when the relative position is zero (also called the "center" position, i.e., when the perpendicular receive coil 44 is longitudinally centered with respect to the transmit coil 36), increases to a local maximum value 70 on either side of the zero position, and then decays back toward zero as the distances increase to the right or left of the local maxima.

Figure 3B:
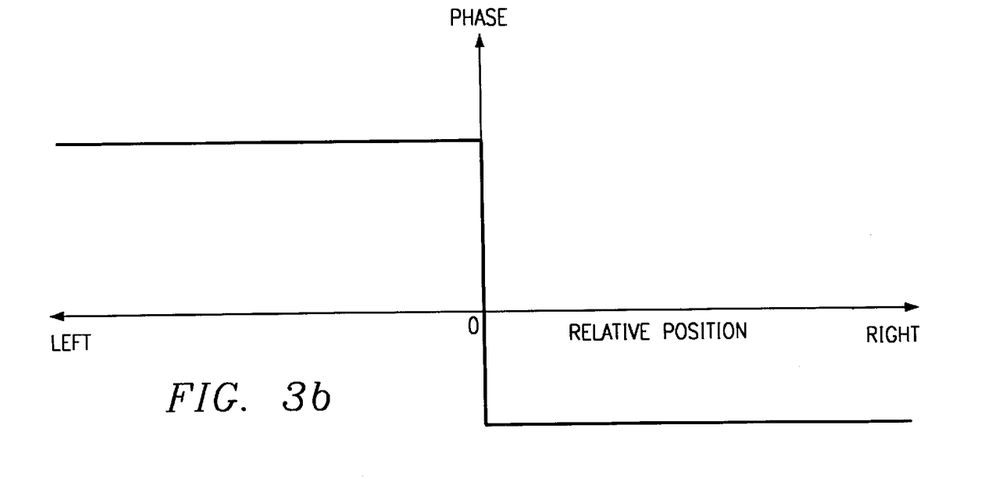
FIG. 3b shows a graph of the phase of the signal produced by the perpendicular receive coil as a function of the relative longitudinal position of the perpendicular receive coil from the longitudinal center of the transmit coil.

FIG. 3b is a graph of the phase of the signal 66 received by the perpendicular receive coil 44 versus the relative longitudinal position of the perpendicular receive coil with respect to the center of the transmit coil 36. The phase of signal 66 is measured with respect to the phase of the signal 62 transmitted by transmit coil 36. As shown in FIG. 3b, the perpendicular receive signal 66 is in phase with the transmit coil signal 62 for negative relative distances (i.e., left of the zero position) and is out of phase for positive relative distances (i.e., right of the zero position).

Figure 3C:
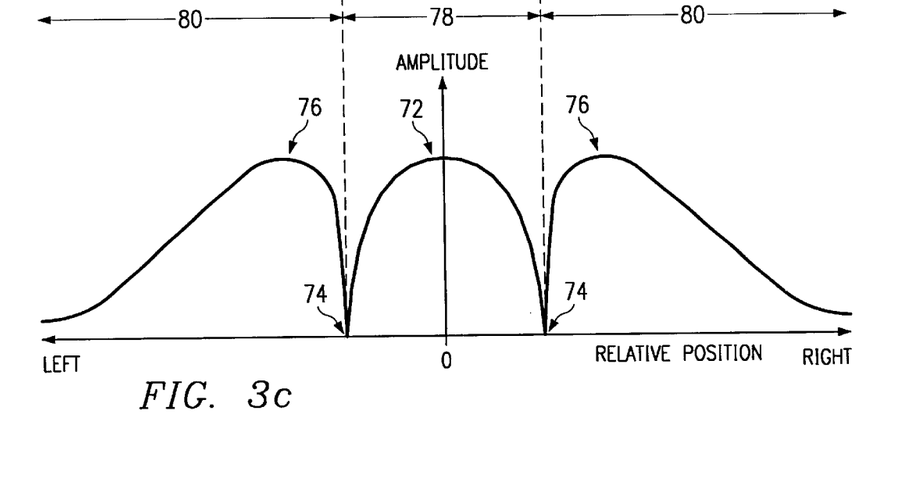
FIG. 3c shows a graph of the amplitude of the signal produced by the parallel receive coil as a function of the relative longitudinal position of the longitudinal center of the parallel receive coil from the longitudinal center of the transmit coil.

FIG. 3c is a graph of the amplitude of the signal 64 received by the parallel receive coil 42 versus the relative longitudinal position of the center of the parallel receive coil with respect to the center of the transmit coil 36. As shown in FIG. 3c, the amplitude signal 64 has a local maximum value 72 when the relative distance is zero (i.e., when the center of the parallel receive coil 42 is longitudinally centered with respect to the transmit coil 36), has nulls 74 at either side of the zero position, then has secondary maxima 76 as the distance from the zero position increases, and finally decays toward zero as the distance increases to the left and right of the secondary maxima 76. The zone 78 between the nulls 74 is referred to as the "near zone" and the zones 80 to the left and right of the nulls are referred to as the "far zone".

Figure 3D:
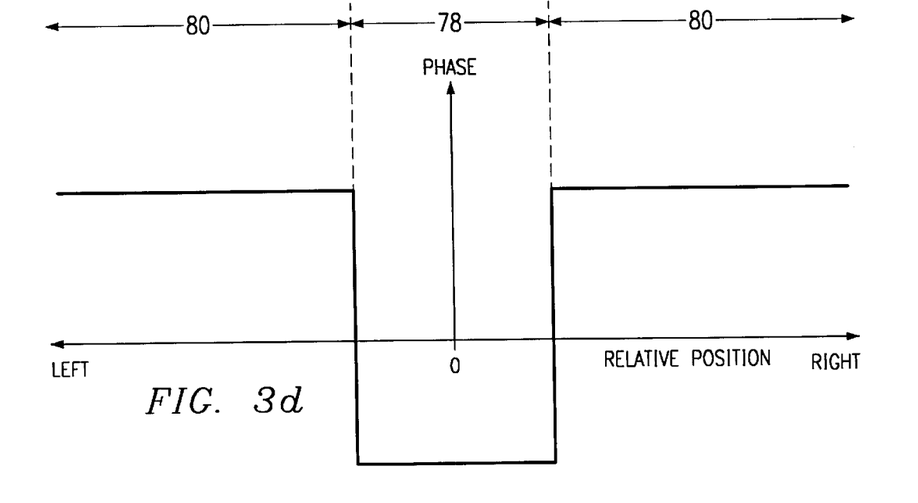
FIG. 3d is a graph of the phase of the signal produced by the parallel receive coil as a function of the relative longitudinal position of the longitudinal center of the parallel receive coil from the longitudinal center of the transmit coil.

FIG. 3d is a graph of the phase of the signal 64 received by the parallel receive coil 42 versus the relative longitudinal position of the center of parallel receive coil with respect to the center of the transmit coil 36. As before, the phase of signal 64 is measured with respect to the phase of the signal 62 transmitted by transmit coil 36. As shown in FIG. 3d, the parallel receive signal 64 is in phase with the transmit coil signal 62 in the far zones 80 and is out of phase within the near zone 78.

Although not required, it is definitely preferred that the receive coils 42, 44 are mounted such that the perpendicular receive coil 44 is longitudinally centered with respect to the parallel receive coil 42, as shown in FIG. 2. Such a mounting arrangement will result in the longitudinal correspondence of the zero/center positions for the two receive coils, greatly simplifying the interpretation of the amplitude and phase relationships necessary to determine the position of the receive coils with respect to the transmit coil 36 (and hence, the position of the mandrel 20 with respect to the BCU 32).

Detection of relative phase of the received low frequency signals 64, 66 requires knowledge of the phase of the transmitted signal 62. A replica of the transmitted signal 62 is therefore maintained in the MCU 34 as a local reference for phase computation purposes. This local reference is continuously adjusted to match the timing of the transmitted signal 62 by means of information received over the DSS radio link 56. Since there is an inherent and variable delay in the DSS radio channel due to software buffering, error correction and channel hopping, the BCU 32 accounts for these delays by keeping a history (e.g., in the form of a running average or other statistical value) of the communication round trip times, i.e., the RT times. The reference phase information transmitted by the BCU 32 to the MCU 34 over the DSS channel is then pre-adjusted by one-half the average round trip delay time (i.e., by 0.5×ART) such that the phase information received by the MCU 34 will allow accurate determination of the phases of the received signals 64, 66.

The MCU 34 amplifies, filters and digitizes the low frequency electromagnetic signals 64, 66 detected by the parallel and perpendicular receive coils 42, 44. The perpendicular receive coil signal 66 is digitized and then cross correlated with various time shifted versions of the local reference. The maximum cross correlation result corresponds to the best match of the signals being correlated. The relative phase information between the transmit coil signal and perpendicular receive coil signal is thus determined. The parallel coil signal 64 is also processed in a similar fashion to determine the parallel phase. The best correlation match also provides amplitude information for both the receive coils 42, 44. The phase information from both receive coils is used by computer control unit 48 to uniquely determine which zone (i.e., near zone left of center, near zone right of center, far zone left of center, far zone right of center) of the relative position the mandrel occupies. The amplitude ratios (i.e., between the two receive coil signals 64, 66) are used by the computer control unit 48 to determine the relative distance of the mandrel within each zone. Since position estimation is based on amplitude ratios rather than absolute values, the estimation is robust and immune to small variations in signal strength and quality.

Figure 4:
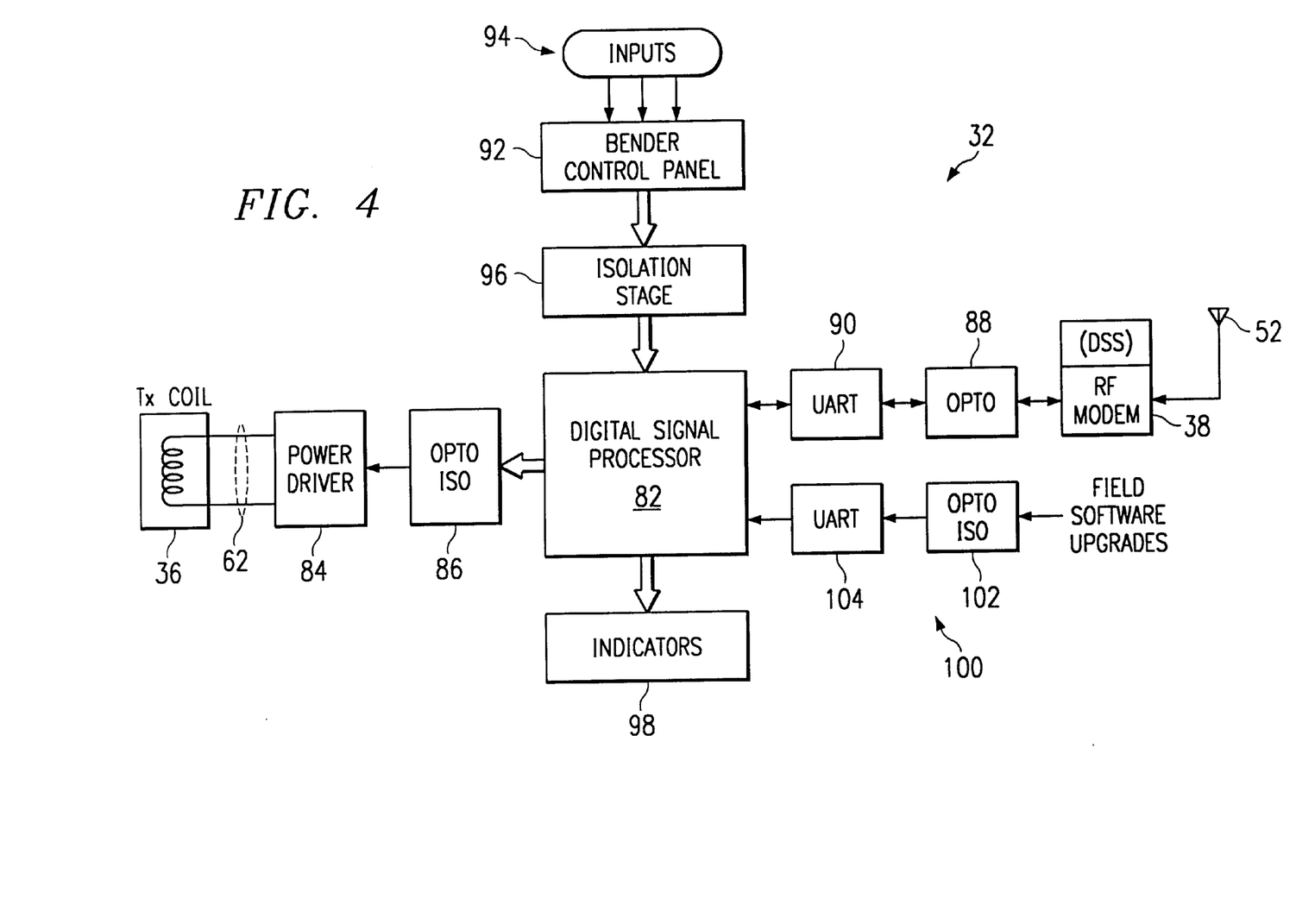
FIG. 4 shows a schematic block diagram of a bender control unit according to a preferred embodiment of the current invention.

FIG. 4 shows a block diagram of a BCU 32 according to one embodiment of the current invention. The BCU 32 includes a digital signal processor ("DSP") 82, a power driver 84 for energizing the transmit coil 36, and the direct sequence spread spectrum radio modem 38. The DSP 82 is operably connected to the power driver 84 by means of optical isolation unit 86. The DSS radio modem 38, which is operably connected to the DSP 82 by means of an optical isolation unit 88 and a universal asynchronous receiver/transmitter ("UART") 90, transmits and receives through antenna 52. A user control panel 92 is operably connected to the DSP 82 by means of optical isolation unit 96 for providing digital and analog inputs (denoted generally by reference numeral 94) to the DSP. Indicators 98 are operably connected to the DSP 82 for receiving signals from the DSP indicating the status of the system components and the position of the mandrel 20 within the pipe 22. The indicators 98 are preferably, although not necessarily, located on the control panel 92. An asynchronous serial link 100, operably connected to the DSP 82 by means of optical isolation unit 102 and UART 104, is provided for diagnostics and maintenance, for example, to allow field software upgrades to be uploaded to the DSP.

Figure 5:
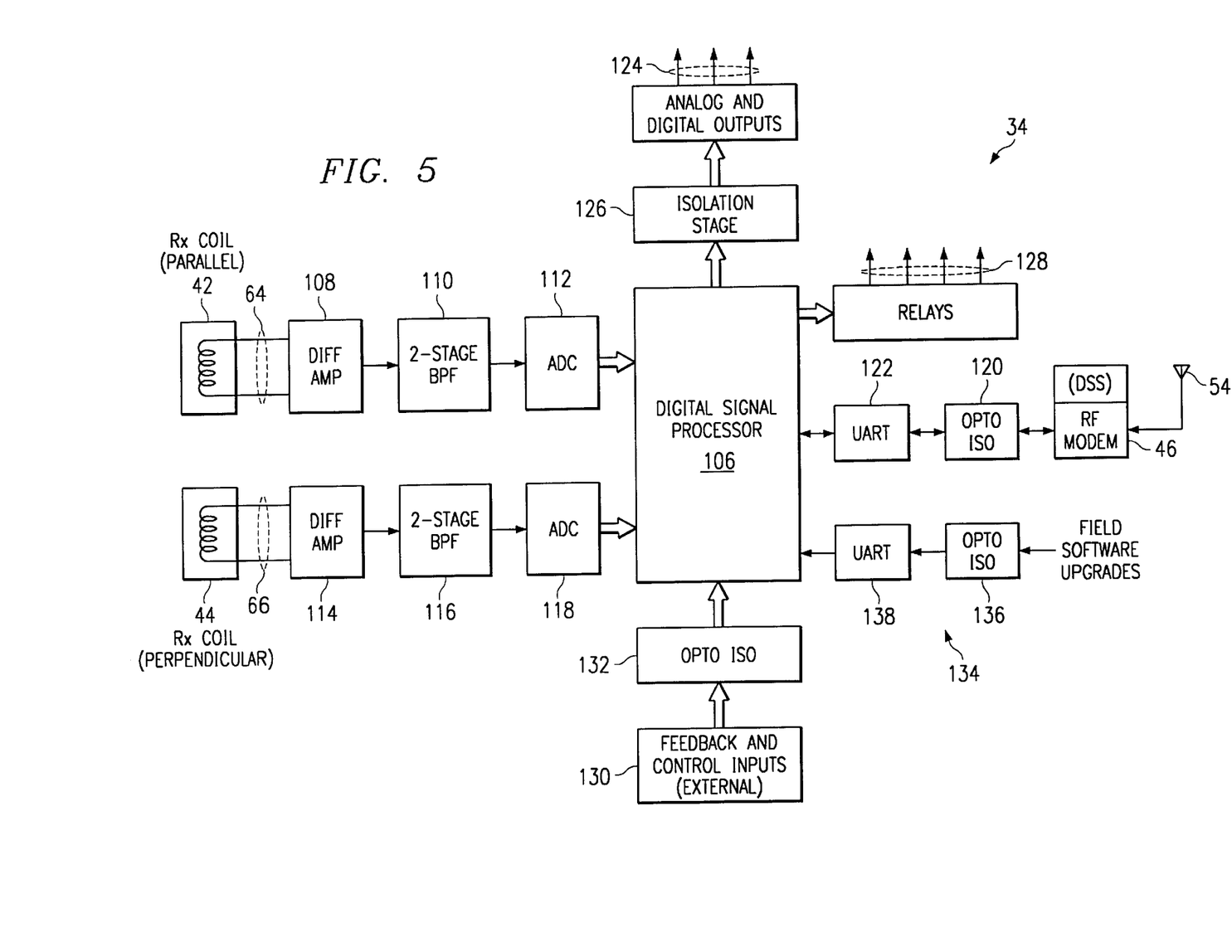
FIG. 5 shows a schematic block diagram of a mandrel control unit according to a preferred embodiment of the current invention.

FIG. 5 shows a block diagram of the MCU 34 according to one embodiment of the current invention. The MCU 34 includes a digital signal processor 106, receive signal conditioning equipment, and a DSS radio modem 46. The signal 64 received by the parallel receive coil 42 is conditioned by a differential amplifier 108 and a band pass filter 110 before being digitized by an analog-to-digital converter 112 and delivered to DSP 106. Similarly, the signal 66 received by the perpendicular receive coil 44 is conditioned by a differential amplifier 114 and a band pass filter 116 before being digitized by an analog-to-digital converter 118 and delivered to the DSP 106. The DSS radio modem 48, which is operably connected to the DSP 106 by means of an optical isolation unit 120 and a UART 122, transmits and receives through antenna 54. Analog and digital output signals (denoted generally by reference number 124) from the DSP 106 pass through an optical isolation unit 126 for controlling mandrel functions such as extension and retraction of the shoes 24, operation of the wheels 28, and control of the engine power unit 30. In addition, DSP 106 can activate relays 128 to control other functions on the mandrel. External control inputs and feedback signals from the control system (denoted generally by reference numeral 130) are fed into the DSP 106 by means of optical isolation unit 132. An asynchronous serial link 134, operably connected to the DSP 106 by means of optical isolation unit 136 and UART 138, is provided for diagnostics and maintenance.

Pipe bending operations involve repeated precise position of the mandrel 20 within the pipe 22. The control system of the current invention eliminates the need for a dedicated mandrel operator to assist the bender apparatus operator by automating the positioning of the mandrel within the pipe. During automatic operation, a single command by the operator at the BCU console 92 will cause the mandrel 20 to retract the supporting shoes 24, move right or left (i.e., longitudinally) through the pipe 22 as necessary to center itself with respect to the transmit coil 36 (e.g., to longitudinally center the receive coils 42, 44 with the transmit coil 36) and then to extend the shoes into engagement with the pipe wall 26 to provide support for the next bend operation.

During automated positioning of the mandrel 22 within the pipe 20, the current mandrel position (with respect to the center position as defined by the transmit coil 36) as reported by the MCU 34 is used by the BCU to compute the power drive applied to the hydraulic proportional valve (not shown) which controls the mandrel forward/reverse motion. This computation is preferably based on a conventional Proportional-Integral-Derivative (PID) control algorithm, however, other algorithms known in the art for positioning control can be used. This feedback control is maintained until the mandrel stabilizes at the center position.

Figure 6:
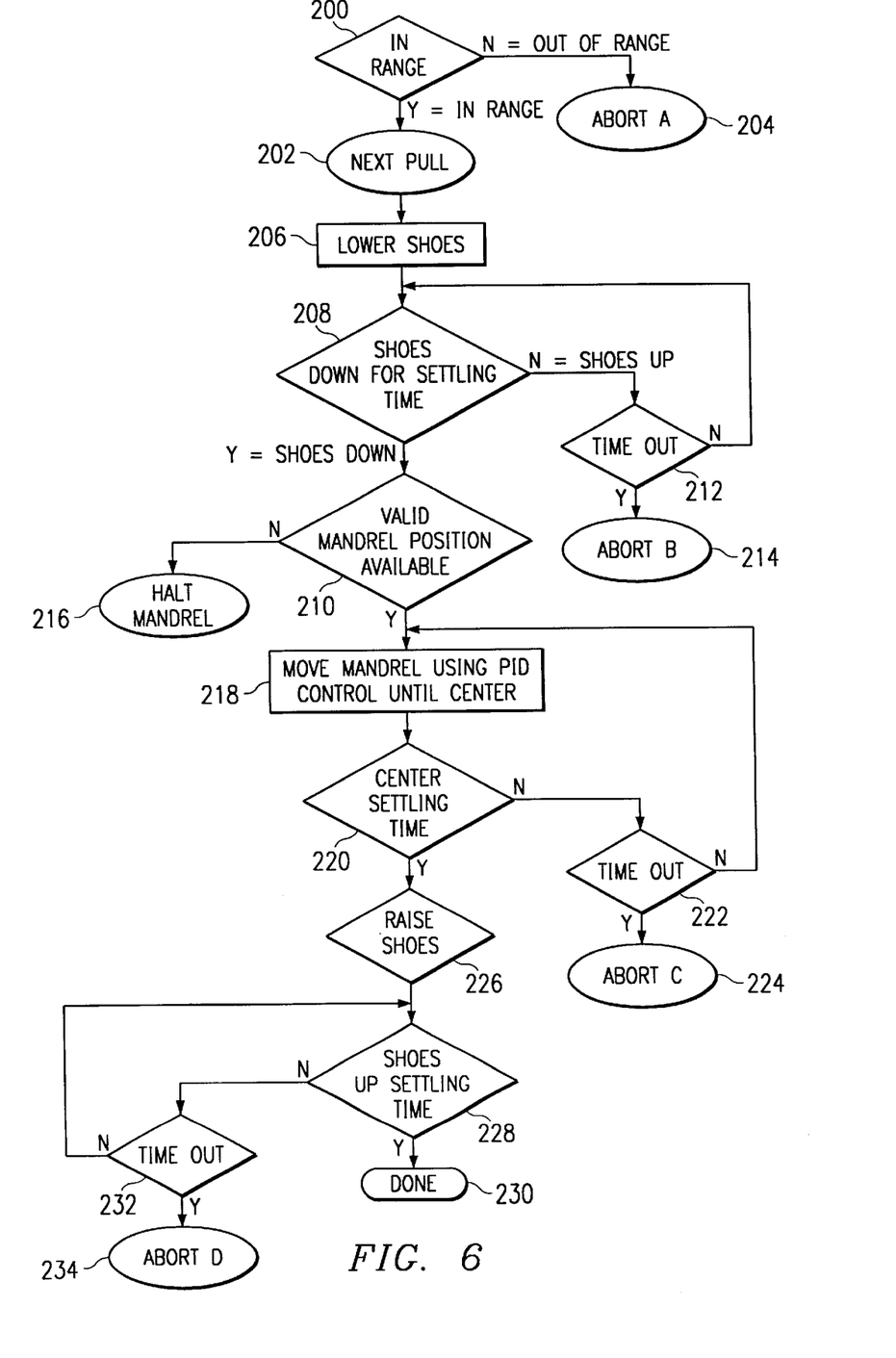
FIG. 6 shows a block diagram of the automated sequence of a events for one bend operation according to another aspect of the current invention.

FIG. 6 provides a block diagram flow chart of the steps comprising an automated bend operation according to another aspect of the current invention. Referring first to block 200, the automated bend procedure begins with a check to determine whether the MCU 34 mounted on the mandrel is within range of the BCU 32 mounted on the bending machine. In the preferred embodiment, the range check comprises determining if the received signal quality and strength of both the parallel receive coil signal 64 and the perpendicular receive coil signal 66 are sufficient to reliably determine the relative positions between the transmit coil 36 and the receive coils 42, 44: If the signals are sufficient, this is considered an "in range" condition, and the procedure advances to block 202; while if either signal is not sufficient, an "out of range" condition exists and the bend operation is aborted to block 204. In the preferred embodiment, an "in range" condition is indicated by continuously lighting a RANGE light 302 on the BCU control panel 92, and an "out of range" condition is indicated by blinking the RANGE light. Aborting the procedure to block 204 disables further automatic operation until an "in range" condition is established.

At block 202, the procedure waits until a NEXT PULL signal is received from the control panel 92. In the preferred embodiment, the NEXT PULL signal is produced when the INCREMENT button is pushed on the control panel 92 during automatic mode of operation (selected by CONTROL MODE switch 306). When the BCU 32 receives a NEXT PULL signal, the procedure advances to block 206, wherein the BCU commands (via radio link 56) the MCU 34 to retract the shoes 24 of the mandrel. The procedure then advances to block 208, where the procedure checks to determine if the shoes 24 have been retracted. In the preferred embodiment, this check is performed by monitoring low side pressure input to the shoe mechanism. If the check determines the shoes 24 are retracted (i.e., down), then the procedure advances to block 210, while if the check determines that the shoes are still extended (i.e., up), then the procedure advances to block 212. Block 212 is simply a timing loop, i.e., if the automatic operation takes more than a preset time limit, this is regarded as a "timeout" condition and the procedure aborts to block 214. Otherwise, the timing loop returns to block 208 to update the shoe position check. In the preferred embodiment, the position of the mandrel shoes 24 is indicated on the control panel 92 by the UP light 308 and the DOWN light 310.

At block 210, the procedure checks to determine if the BCU 32 has valid mandrel position value which has been received from the MCU 34. If so, the procedure advances to block 218, otherwise, the procedure aborts to block 216. Aborting the procedure to block 216 disables further automatic operation until an valid position is received.

At block 218, the BCU 32 transmits movement commands to the MCU 34 as necessary to move the mandrel 20 to the center position (i.e., zero position) with respect to the transmit coil 36. As previously described, the parameters of the movement commands (e.g., direction, speed) are established by a control algorithm (e.g., proportional-integral-derivative algorithm) using an estimate of the current position reported by the MCU. The movement command resulting from the control algorithm is then transmitted by the BCU to the MCU over the radio link 56. Once received by the MCU, the movement command causes the MCU to produce digital or analog outputs which activate the mandrel controls for forward and reverse motion. The mandrel's position is continuously updated to the BCU over the radio link 56 and the new positions are used as feedback in the control algorithm to adjust subsequent movement commands. The feedback control continues until the mandrel stabilizes at the center/zero position.

While the BCU is moving the mandrel toward the center/zero position, the procedure has meanwhile advanced to block 220, where a check is performed to determine whether the mandrel has achieved the center position. If so, the procedure advances to block 226, while if not, the procedure enters a timing loop through block 222 and back to block 218. If the automatic centering operation takes more than a preset time limit, this is regarded as a "timeout" condition and the procedure aborts to block 224.

At block 226, the BCU 32 commands (via radio link 56) the MCU 34 to extend the shoes 24 of the mandrel. The procedure then advances to block 228, where the procedure checks to determine if the shoes 24 have been extended. In the preferred embodiment, this check is performed by monitoring high side pressure input to the shoe mechanism. If the check determines the shoes 24 are extended (i.e., up), then the procedure advances to block 230 (end of the bend procedure), while if the check determines that the shoes are still retracted (i.e., down), then the procedure advances to block 232. Block 232 is another timing loop. If the automatic "shoes up" operation takes more than a preset time limit, this is regarded as a "timeout" condition and the procedure aborts to block 234. Otherwise, the timing loop returns to block 228 to update the shoe position check.

In a preferred embodiment of the invention, the procedure includes periodic checks for error conditions including loss of radio communication, poor signal quality or strength at the receive coils 42, 44, excessive time required for automatic operation, emergency stop by BCU operator, manual override control inputs by BCU operator. The determination that any of such error conditions exists causes premature termination of the automatic mode of operation and/or shutdown of controls for safety purposes. Further in the preferred embodiment, short-term error conditions trigger the shutdown of hydraulic control signals for shoes up/down and forward/reverse motion of the mandrel. If the error conditions persist for more than a predetermined time, the mandrel engine is shutdown for safety purposes.

Figure 7:
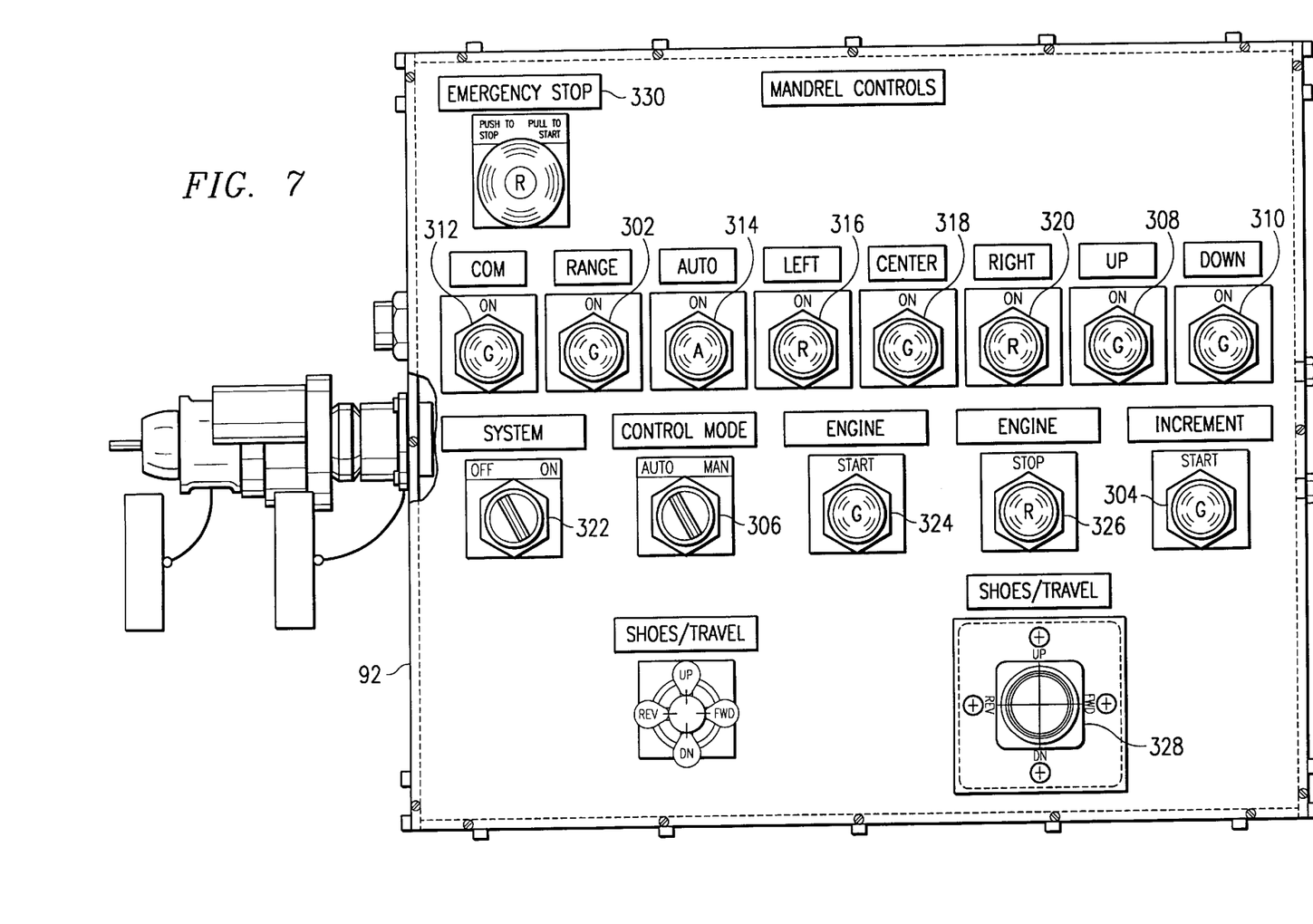
FIG. 7 shows the control panel layout for the bender control unit.

Referring now to FIG. 7, the control layout of the BCU control panel 92 for the preferred embodiment is shown. Numerous indicators of system status are provided, including a COM light 312 (lit when radio link operating), the RANGE light 302 (lit when valid position information available), an AUTO light 314 (lit to indicate automatic mode enabled), a LEFT light 316 (lit to show when mandrel detected passing the center position from right to left), a RIGHT light 320 (lit to show when mandrel detected passing the center position from left to right), a CENTER light 318, the UP light 308 and the DOWN light 310 lit to show the position of the mandrel shoes 24. Switches are provided to activate various system functions, including SYSTEM switch 322 (turns system on/off), CONTROL MODE switch 306 (selects automatic/manual mode), ENGINE START switch 324 (turns mandrel engine on), ENGINE STOP switch 326 (turns mandrel engine off), and INCREMENT switch 304 (advances pipe in bender to next bending position, and if in automatic mode, initiates automatic mandrel centering procedure). A control joystick 328 is provided, allowing the bender operator to remotely control the mandrel movement (forward/reverse, i.e., right/left with respect to zero position) and shoe position as necessary. Finally, an emergency switch 330 is provided to shut down the system.

While several aspects and embodiments of the current invention have been described in detail herein, it will be readily apparent that many changes in detail may be made as a matter of design choices, without departing from the spirit and scope of the invention, as defined by the appended claims.

What is claimed is:

1. An apparatus for controlling the position of a mandrel within a pipe comprising:

an exterior control unit including a low frequency signal generator; a transmit coil, and a first radio frequency transceiver;

said transmit coil being positioned proximate to the outside surface of a wall of said pipe and having a longitudinal axis oriented parallel to the longitudinal axis of the pipe;

said signal generator being operably connected to said transmit coil to transmit low frequency electromagnetic signals through said wall;

said first radio frequency transceiver being a direct sequence spread spectrum radio frequency modem transmitting a radio frequency signal;

an interior control unit mounted on said mandrel and including a first receive coil, a second receive coil and a second radio frequency transceiver;

said first receive coil having a longitudinal axis oriented parallel to the longitudinal axis of the pipe, said coil being adapted to receive said low frequency electromagnetic signals passing through said wall;

said second receive coil having a longitudinal axis oriented perpendicular to the longitudinal axis of the pipe, said coil being adapted to receive said low frequency electromagnetic signals passing through said wall;

said second radio frequency transceiver adapted to receive said radio frequency signal containing information regarding the phase of said low frequency signal; and a digital signal processor adapted to compare the phase of signals received by said first and said second receive coils to a time base containing information regarding the phase of said low frequency signal received from said first radio frequency transceiver.

2. An apparatus for controlling the position of a mandrel within a pipe in accordance with claim 1, wherein said second radio frequency transceiver is a direct sequence spread spectrum radio frequency modem.

3. An apparatus for controlling the position of a mandrel within a pipe in accordance with claim 1, wherein said radio frequency signal has a frequency of about 2.4 GHz.

4. An apparatus for controlling the position of a mandrel within a pipe comprising:

an exterior control unit including a low frequency signal generator; a transmit coil, and a first radio frequency transceiver;

said transmit coil being positioned proximate to the outside surface of a wall of said pipe and having a longitudinal axis oriented parallel to the longitudinal axis of the pipe;

said signal generator being operably connected to said transmit coil to transmit low frequency electromagnetic signals through said wall, said low frequency electromagnetic signals having a frequency within the range from about 21 Hz to about 24 Hz;

said first radio frequency transceiver transmitting a radio frequency signal;

an interior control unit mounted on said mandrel and including a first receive coil, a second receive coil and a second radio frequency transceiver;

said first receive coil having a longitudinal axis oriented parallel to the longitudinal axis of the pipe, said coil being adapted to receive said low frequency electromagnetic signals passing through said wall;

said second receive coil having a longitudinal axis oriented perpendicular to the longitudinal axis of the pipe, said coil being adapted to receive said low frequency electromagnetic signals passing through said wall;

said second radio frequency transceiver adapted to receive said radio frequency signal containing information regarding the phase of said low frequency signal; and a digital signal processor adapted to compare the phase of signals received by said first and said second receive coils to a time base containing information regarding the phase of said low frequency signal received from said first radio frequency transceiver.

5. An apparatus for controlling the position of a mandrel within a pipe in accordance with claim 4, wherein said low frequency electromagnetic signals have a frequency within the range from about 22 Hz to about 23 Hz.

6. An apparatus for controlling the position of a mandrel within a pipe comprising:

an exterior control unit including a low frequency signal generator; a transmit coil, and a first radio frequency transceiver;

said transmit coil being positioned proximate to the outside surface of a wall of said pipe and having a longitudinal axis oriented parallel to the longitudinal axis of the pipe;

said signal generator being operably connected to said transmit coil to transmit low frequency electromagnetic signals through said wall;

said first radio frequency transceiver transmitting a radio frequency signal;

an interior control unit mounted on said mandrel and including a first receive coil, a second receive coil and a second radio frequency transceiver;

said first receive coil having a longitudinal axis oriented parallel to the longitudinal axis of the pipe, said coil being adapted to receive said low frequency electromagnetic signals passing through said wall;

said second receive coil having a longitudinal axis oriented perpendicular to the longitudinal axis of the pipe, said coil being adapted to receive said low frequency electromagnetic signals passing through said wall;

said first and second receive coils being mounted such that said second receive coil is longitudinally centered with respect to said first receive coil;

said second radio frequency transceiver adapted to receive said radio frequency signal containing information regarding the phase of said low frequency signal; and a digital signal processor adapted to compare the phase of signals received by said first and said second receive coils to a time base containing information regarding the phase of said low frequency signal received from said first radio frequency transceiver.

7. An apparatus for controlling the position of a mandrel within a pipe comprising:

an exterior control unit including a low frequency signal generator; a transmit coil, and a first radio frequency transceiver;

said transmit coil being positioned proximate to the outside surface of a wall of said pipe and having a longitudinal axis oriented parallel to the longitudinal axis of the pipe;

said signal generator being operably connected to said transmit coil to transmit low frequency electromagnetic signals through said wall;

said first radio frequency transceiver transmitting a radio frequency signal;

an interior control unit mounted on said mandrel and including a first receive coil, a second receive coil and a second radio frequency transceiver;

said first receive coil having a longitudinal axis oriented parallel to the longitudinal axis of the pipe, said coil being adapted to receive said low frequency electromagnetic signals passing through said wall;

said second receive coil having a longitudinal axis oriented perpendicular to the longitudinal axis of the pipe, said coil being adapted to receive said low frequency electromagnetic signals passing through said wall;

said second radio frequency transceiver adapted to receive said radio frequency signal containing information regarding the phase of said low frequency signal;

said interior control unit being adapted to maintain a replica of said low frequency signal transmitted by said exterior control unit, said replica being continuously adjusted to match the timing of said low frequency signal using information received from said exterior control unit by said second radio frequency transceiver; and a digital signal processor adapted to compare the phase of signals received by said first and said second receive coils to a time base containing information regarding the phase of said low frequency signal received from said first radio frequency transceiver.

8. An apparatus for controlling the position of a mandrel within a pipe comprising:

an exterior control unit including a low frequency signal generator; a transmit coil, and a first radio frequency transceiver;

said transmit coil being positioned proximate to the outside surface of a wall of said pipe and having a longitudinal axis oriented parallel to the longitudinal axis of the pipe;

said signal generator being operably connected to said transmit coil to transmit low frequency electromagnetic signals through said wall;

said first radio frequency transceiver transmitting a radio frequency signal;

an interior control unit mounted on said mandrel and including a first receive coil, a second receive coil and a second radio frequency transceiver;

said first receive coil having a longitudinal axis oriented parallel to the longitudinal axis of the pipe, said coil being adapted to receive said low frequency electromagnetic signals passing through said wall;

said second receive coil having a longitudinal axis oriented perpendicular to the longitudinal axis of the pipe, said coil being adapted to receive said low frequency electromagnetic signals passing through said wall;

said second radio frequency transceiver adapted to receive said radio frequency signal containing information regarding the phase of said low frequency signal; and a digital signal processor adapted to compare the phase of signals received by said first and said second receive coils to a time base containing information regarding the phase of said low frequency signal received from said first radio frequency transceiver;

wherein said radio frequency signal transmitted by said first radio frequency transceiver includes a plurality of command data packets, said interior control unit is adapted to receive said command data packets and to transmit an answering radio frequency signal including a corresponding response data packet after receiving each of said command data packets, and said exterior control unit is adapted to receive said answering radio frequency signal.

9. An apparatus for controlling the position of a mandrel within a pipe in accordance with claim 8, wherein said command data packets includes information regarding the phase of said low frequency signal.

10. An apparatus for controlling the position of a mandrel within a pipe in accordance with claim 8, wherein said exterior control unit is adapted to calculate a round-trip transmission time for each of said command data packets by first recording a send time when one of said command data packets is transmitted, then recording a receipt time when a response data package corresponding to said one of said command data packets is received by said exterior control unit, and then determining the time difference between said send time and said receipt time, said time difference being said round-trip transmission time.

11. An apparatus for controlling the position of a mandrel within a pipe in accordance with claim 10, wherein said exterior control unit is adapted to maintain a running average round-trip time, said running average round-trip time being calculated by taking the arithmetic average of a predetermined number of the most recent of said round-trip transmission times.

12. An apparatus for controlling the position of a mandrel within a pipe in accordance with claim 11, wherein said predetermined number of the most recent of said round-trip transmission times used for calculating said running average round-trip time is 100.

13. An apparatus for controlling the position of a mandrel within a pipe in accordance with claim 11, wherein time base information regarding the phase of said low frequency signal is pre-adjusted by an amount equal to 0.5 times the running average round-trip time before being transmitted by said exterior control unit over said radio frequency signal.

14. An apparatus for controlling the position of a mandrel within a pipe comprising:
- a first control unit including a transmit coil and a first radio frequency transceiver;
- said transmit coil being positionable proximate to one of an inside surface and an outside surface of a wall of said pipe and being adapted to transmit low frequency signals through said wall;
- said first radio frequency transceiver being adapted to transmit radio signals containing information regarding the phase of said low frequency signal;
- a second control unit including a first receive coil, a second receive coil and a second radio frequency transceiver;
- said first receive coil being positionable proximate to an other of said inside surface and said outside surface of said wall of said pipe, having a first orientation with respect to the longitudinal axis of said pipe, and being adapted to receive said low frequency signals passing through said wall;
- said second receive coil being positionable proximate to said other of said inside surface and said outside surface of said wall of said pipe, having a second orientation with respect to the longitudinal axis of said pipe, and being adapted to receive said low frequency signals passing through said wall;
- said second radio frequency transceiver being adapted to receive said radio signals containing information regarding the phase of said low frequency signals; and
- a digital signal processor adapted to compare the phase of low frequency signals received by said first and said second receive coils to a time base containing information regarding the phase of said low frequency signal received from said first radio frequency transceiver.

15. An apparatus for controlling the position of a mandrel within a pipe in accordance with claim 14, wherein said digital signal processor is further adapted to compare the amplitude of said signal received by one of said first and second receive coils to the amplitude of the signal received by another of said first and second receive coils.

16. An apparatus for controlling the position of a mandrel within a pipe in accordance with claim 14, wherein said second control unit is adapted to maintain a replica of said low frequency signal transmitted by said first control unit, said replica being continuously adjusted to match the timing of said low frequency signal using information received from said first control unit by said second radio frequency transceiver.

17. An apparatus for controlling the position of a mandrel within a pipe in accordance with claim 14, wherein said radio signal transmitted by said first radio frequency transceiver includes a plurality of command data packets, said second control unit is adapted to receive said command data packets and to transmit an answering radio signal including a corresponding response data packet after receiving each of said command data packets, and said first control unit is adapted to receive said answering radio signal.

18. An apparatus for controlling the position of a mandrel within a pipe in accordance with claim 17, wherein said first control unit is adapted to calculate a round-trip transmission time for each of said command data packets by first recording a send time when one of said command data packets is transmitted, then recording a receipt time when a response data package corresponding to said one of said command data packets is received by said first control unit, and then determining the time difference between said send time and said receipt time, said time difference being said round-trip transmission time, and said first control unit is further adapted to use said round-trip transmission time to adjust time base information regarding the phase of said low frequency signal before transmitting said time base information over said radio signal.

19. A method for determining the position of an apparatus within a pipe, said method comprising the steps of:
- transmitting a low frequency electromagnetic signal from a transmit coil which is operably connected to a first control unit, said transmit coil being located at a known position outside said pipe;
- transmitting a radio frequency signal from a first transceiver which is operably connected to said first control unit, said first transceiver being located outside said pipe;
- receiving said low frequency electromagnetic signal with first and second receive coils which are mounted at known positions, respectively, on said apparatus within said pipe and operably connected to a second control unit;
- receiving said radio frequency signal with a second transceiver which is mounted on said apparatus within said pipe and operably connected to said second control unit; and
- using a digital signal processor to compare the phase of the low frequency signals received by said first and second receive coils to a time base containing information regarding the phase of said low frequency signal, said information regarding the phase of the low frequency signal being transmitted from said first transceiver to said second transceiver on said radio frequency signal.

20. A method for determining the position of an apparatus within a pipe in accordance with claim 19, further comprising the step of maintaining in said second control unit a replica of said low frequency signal transmitted by said transmit coil, said replica being continuously adjusted to match the timing of said low frequency signal transmitted by said transmit coil using information received by said second transceiver from said first transceiver on said radio frequency signal.

21. A method for determining the position of an apparatus within a pipe in accordance with claim 19, wherein said radio frequency signal transmitted by said first transceiver includes a plurality of command data packets produced by said first control unit, said command data packets including information regarding the phase of said low frequency signal.

22. A method for determining the position of an apparatus within a pipe in accordance with claim 21, further comprising the steps of:

receiving in said second control unit said command data packets transmitted by said first transceiver;

producing in said second control unit, for each of said command data packets received by said second control unit, a corresponding response data packet;

transmitting an answering radio frequency signal from said second transceiver, said answering radio frequency signal including said corresponding response data packets;

receiving said answering radio frequency signal with said first transceiver; and receiving in said first control unit said response data packets corresponding to said command data packets previously produced.

23. A method for determining the position of an apparatus within a pipe in accordance with claim 22, further comprising the step of calculating a round-trip transmission time for each of said command data packets by first recording a send time when one of said command data packets is produced by said first control unit, then recording a receipt time when a response data package corresponding to said one of said command data packets is received by said first control unit, and then determining the time difference between said send time and said receipt time, said time difference being said round-trip transmission time.

24. A method for determining the position of an apparatus within a pipe in accordance with claim 23, further comprising the step of pre-adjusting said information regarding the phase of said low frequency signal included in command data packets to be transmitted using information regarding round-trip times for previously transmitted command data packets.

25. A method for controlling the position of an apparatus within a pipe, said method comprising the steps of:

determining a current position of said apparatus within said pipe by transmitting a low frequency electromagnetic signal from a transmit coil which is operably connected to a first control unit, said transmit coil being located at a known position outside said pipe, transmitting a radio frequency signal from a first transceiver which is operably connected to said first control unit, said first transceiver being located outside said pipe, receiving said low frequency electromagnetic signal with first and second receive coils which are mounted at known positions, respectively, on said apparatus within said pipe and operably connected to a second control unit, receiving said radio frequency signal with a second transceiver which is mounted on said apparatus within said pipe and operably connected to said second control unit, and using a digital signal processor to compare the phase of the low frequency signals received by said first and second receive coils to a time base containing information regarding the phase of said low frequency signal, said information regarding the phase of the low frequency signal being transmitted from said first transceiver to said second transceiver on said radio frequency signal;

determining a desired position of said apparatus within said pipe;

determining a position error between said current position and said desired position;

using a control algorithm to calculate a control input needed to reduce said position error; and moving said apparatus in response to said control input.

26. A method for controlling the position of an apparatus within a pipe in accordance with claim 25, wherein said control algorithm is proportional-integral-derivative control algorithm.

* * * * *

UNITED STATES PATENT AND TRADEMARK OFFICE
CERTIFICATE OF CORRECTION

PATENT NO. : 6,354,123 B1
DATED : March 12, 2002
INVENTOR(S) : Shankar T. Rajagopalan et al.

It is certified that error appears in the above-identified patent and that said Letters Patent is hereby corrected as shown below:

Column 3,
Line 39, "provided", and insert -- provide --.

Column 4,
Line 9, after "further", delete "to".

Column 5,
Line 13, delete "shows", and insert -- show --.

Column 10,
Line 5, after "generator", delete ";", and insert -- , --.
Line 48, after "generator", delete ";", and insert -- , --.

Column 11,
Line 21, after "generator", delete ";", and insert -- , --.
Line 59, after "generator", delete ";", and insert -- , --.

Column 12,
Line 33, after "generator", delete ";", and insert -- , --.

Signed and Sealed this

Eighteenth Day of June, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.   : 6,354,123 B1  
DATED        : March 12, 2002  
INVENTOR(S)  : Shankar T. Rajagopalan et al.

Page 1 of 1

It is certified that error appears in the above-identified patent and that said Letters Patent is hereby corrected as shown below:

Column 3,  
Line 39, delete "provided", and insert -- provide --.

Column 4,  
Line 9, after "further", delete "to".

Column 5,  
Line 13, delete "shows", and insert -- show --.

Column 10,  
Line 5, after "generator", delete ";", and insert -- , --.  
Line 48, after "generator", delete ";", and insert -- , --.

Column 11,  
Line 21, after "generator", delete ";", and insert -- , --.  
Line 59, after "generator", delete ";", and insert -- , --.

Column 12,  
Line 33, after "generator", delete ";", and insert -- , --.

This certificate supersedes Certificate of Correction issued June 18, 2002.

Signed and Sealed this

Seventeenth Day of December, 2002

JAMES E. ROGAN  
*Director of the United States Patent and Trademark Office*